United States Patent Office 2,732,256
Patented Jan. 24, 1956

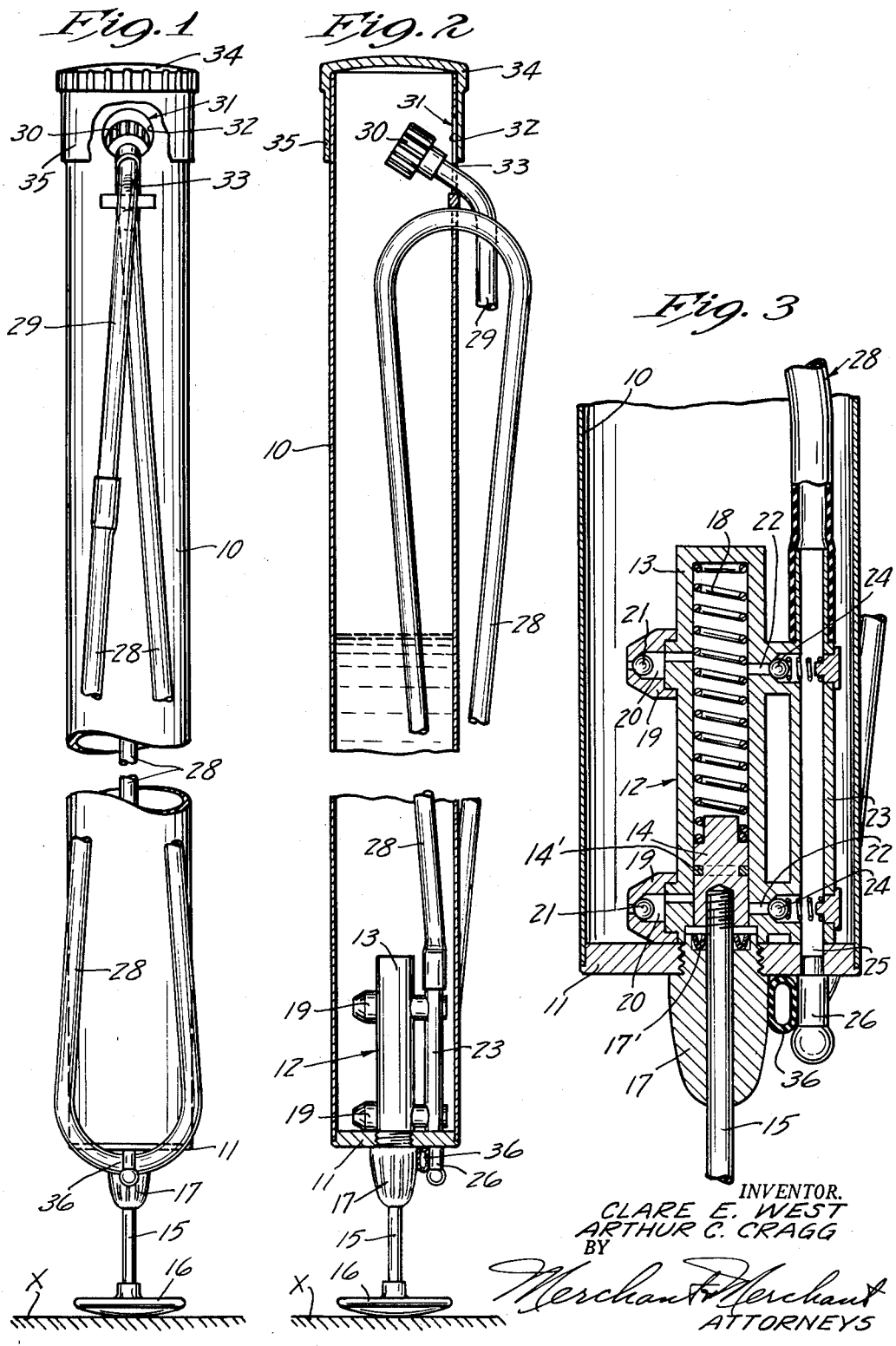

2,732,256

DEVICE FOR SPRAYING INSECTICIDES AND WEED KILLERS

Clare E. West, Minneapolis, and Arthur C. Cragg, St. Paul, Minn., assignors to Donaldson Company, Inc., St. Paul, Minn., a corporation of Delaware Application January 17, 1955, Serial No. 482,185

4 Claims. (Cl. 299—98)

Our invention relates to improvements in devices for spraying liquid insecticides and weed killers. In particular, it relates to a portable hand-operated liquid container and sprayer for spraying lawns with weed killers and flowers, bushes, trees and the like with insecticides.

An object of our invention is to provide an improved device of the class described which is simply and effectively operated and which is easily handled.

Another object of our invention is to provide an elongated device which can be handled much in the manner of a cane and involving an easily and simply operated pump mechanism for effective spraying of the liquid weed killers or insecticides.

Another object of our invention is to provide a novel and improved device of the class described including a nozzle-equipped flexible delivery conduit which may be compactly disposed in an effective storage position when not in use.

Other objects of the invention are the provision of a device of the class described, which is highly efficient in operation, is very convenient to use, has a minimum of parts, has exceptionally long life and can be produced at a very low cost.

These and other objects and advantages of our invention will become apparent from the following specification and claims, reference being had to the accompanying drawings wherein:

Fig. 1 is a view in side elevation, some parts broken away, of the invention;

Fig. 2 is a view in axial section of the structure shown in Fig. 1, with some parts broken away; and Fig. 3 is an enlarged fragmentary view in axial section of a portion of Fig. 2.

Referring more particularly to the drawings, wherein like parts will be indicated by the same numeral, the numeral 10 indicates an elongated normally vertically disposed tubular outer casing that is closed at its bottom end by head 11. Tubular outer casing 10 is adapted to store liquid, which may be any suitable weed killer or insecticide, to a predetermined maximum level spaced below its top end. A piston pump 12 is disposed in the bottom portion of the tubular outer casing 10 below the normal maximum fluid level therein and comprises a pressure cylinder 13 mounted fast on the head 11 and extending generally upwardly therefrom. A reciprocating piston 14 equipped with a piston ring 14' is mounted in pressure cylinder 13 and is fixedly secured on the upper end of a piston rod or plunger 15, having a ground-engaging foot 16 at its opposite end. Piston rod 15 works through the normally lower end of pressure cylinder 13, and the corresponding bottom end of outer casing 10 through a bearing boss 17 of head 11 and a conventional sealing ring 17' in the boss 17. A compression spring 18, mounted on a reduced end of piston 14 and disposed between the upper closed end of pressure cylinder 13 and piston 14, yieldably urges pressure piston 14 and piston rod or plunger 15 in the direction of piston rod extension or normally generally vertically downwardly.

Laterally outwardly projecting vertically spaced nipples 19 are anchored to pressure cylinder 13 to define spaced inlet passages 20. Inlet passages 20 are equipped with ball check valves 21 and disposed in liquid-receiving communication with the liquid containing lower portion of tubular outer casing 10. Pressure cylinder 13 is also provided with spaced outlet passages 22, which are connected by manifold tubing 23 and equipped with spring biased ball check valves 24. Manifold 23 has its downwardly opening end aligned with a bore 25 formed in head 11, which is closed by a downwardly projecting plug 26 rigidly secured to head 11. The upper end of manifold 23 is telescopically received in a fluid tight fit by the end of a flexible delivery conduit or hose 28 which extends generally upwardly from manifold 23 and the check valve-equipped outlet passages 22, within the outer casing 10 and from thence outwardly through a side of the casing 10, preferably above the predetermined maximum level of the liquid therein. The free outer end portion of flexible conduit 28, indicated by the numeral 29, is substantially rigid and is connected to a spray nozzle 30.

An opening 31 is formed through the outer casing 10 adjacent to but spaced from the upper end thereof and above the maximum liquid level therein, which comprises a relatively large diameter upper portion 32, sized to receive the spray nozzle 30, and a depending relatively narrow portion 33, having a width less than the diameter of the spray nozzle 30 but greater than that of the outer end portion 29 of delivery conduit 28. Spray nozzle 30 is of a greater diameter than that of delivery conduit 28, and opening 31 is adapted to receive and store and anchor the nozzle 30 within the upper portion of the casing 10. An upwardly displaceable cap 34 closes the upper end portion of casing 10 and acts to lock the nozzle 30 and delivery conduit 28. Cap 34 accomplishes the latter by a depending portion 35 which covers and closes the enlarged nozzle-receiving portion 32 of opening 31 but terminates above the conduit 28 when the latter is disposed in the narrow portion 33 of opening 31, this is clearly shown in Fig. 2. Delivery conduit 28 at its storage position is looped around the lower end of casing 10 and extends between bearing boss 17 and plug 26, as indicated by the numeral 36, before the nozzle 30 is disposed within the casing 10 through opening 31; so that flexible tubing 28 is compactly disposed along the casing 10 and is securely locked in its storage position.

In use, the operator carries our invention by the upper end of tubular casing 10, much in the manner of a cane, and grasps the rigid portion 29 of delivery conduit 28 with the other hand to handle and direct the nozzle 30. At each location where the operator desires to spray, foot 16 is rested on the ground, indicated by the letter X, and a spray is produced by vertical reciprocation of the tubular casing 10. Manual pressure is utilized for the downward stroke and spring 18 produces the upward return stroke. The lowermost inlet passage 20 charges the cylinder 13 under generally vertically downward movements of tubular casing 10, and the other or upper inlet passage 20 charges the cylinder 13 under upward movements thereof. It is clear that upon downward movements of the outer casing 10, the liquid weed killer or insecticide received by pressure cylinder 13 is discharged through the uppermost outlet passage 22 to the nozzle 30, and the other outlet passage 22 discharges during the spring biased upward return stroke of casing 10.

Spring-loaded ball check valves 24 in the outlet passages 22 provide positive shut-off to delivery conduit 28 and also prevent siphoning of the liquid contents within casing 10 if nozzle 30 is laid on the ground or lowered below the level of the liquid head in casing 10.

Our invention may be modified in many substitutions and equivalents, one of which might be that piston rod or plunger 15 extends through the upper end of pressure cylinder 13 and through the corresponding upper end of outer casing 10, wherein the plunger and piston could be reciprocated by hand in a relatively fixed pressure cylinder. We have shown a preferred commercial embodiment of our improved device, which has been thoroughly tested and found to be completely satisfactory for the accomplishment of the objectives set forth; however, we intend to be limited solely by the scope of the appended claims.

What we claim is:

1. In a portable hand-operated liquid container and sprayer, an elongated normally vertically disposed tubular outer casing that is closed at its bottom and is adapted to store liquid to a predetermined maximum level spaced below the top thereof, a piston pump in the bottom portion of the tubular outer casing below the normal maximum fluid level therein, said pump comprising a pressure cylinder carried by and extending upwardly from the closed bottom of the tubular outer casing, a reciprocating piston mounted in said pressure cylinder, a piston rod extending from the pressure piston and working through one end of the pressure cylinder and the corresponding end of the outer casing, a spring yieldably urging the pressure piston and plunger in the direction of piston rod extension, the pressure cylinder being provided with check valve equipped inlet and outlet passages located adjacent the bottom interior portion of the outer casing, the said check valve equipped inlet passage being in liquid receiving communication with the liquid containing lower portion of the tubular outer casing, and a flexible delivery conduit extending from the check valve equipped outlet passage of the pressure pump upwardly through and to a level above the maximum liquid level in the outer casing and from thence outwardly through the side of the latter, and a spray nozzle on the outer end of the flexible conduit.

2. In a portable hand-operated liquid container and sprayer, an elongated normally vertically disposed tubular outer casing that is closed at its bottom and is adapted to store liquid to a predetermined maximum level spaced below the top thereof, a piston pump in the bottom portion of the tubular outer casing below the normal maximum fluid level therein, said pump comprising a pressure cylinder carried by and extending upwardly from the closed bottom of the tubular outer casing, a reciprocating piston mounted in said pressure cylinder, a piston rod extending from the pressure piston and working through one end of the pressure cylinder and the corresponding end of the outer casing, a spring yieldably urging the pressure piston and plunger in the direction of piston rod extension, the pressure cylinder being provided with check valve equipped inlet and outlet passages located adjacent the bottom interior portion of the outer casing, the said check valve equipped inlet passage being in liquid receiving communication with the liquid containing lower portion of the tubular outer casing, and a flexible delivery conduit extending upwardly from the check valve-equipped outlet passage of the pressure pump within the outer casing and from thence outwardly through a side of the latter, a spray nozzle on the outer end of the flexible conduit, the upper side portion of the outer casing being provided with an opening therethrough above the maximum liquid level therein but spaced from its upper end, said opening comprising a relatively large diameter upper portion sized to receive the said spray nozzle, and a depending relatively narrow portion of a width less than the diameter of the spray nozzle but greater than that of the delivery conduit, said spray nozzle being of greater diameter than that of the delivery conduit, whereby to receive and store and anchor the nozzle within the upper portion of the casing, and an upwardly displaceable cap closing the upper end portion of the casing, said cap being in telescopic engagement with the casing and having a depending portion which covers and closes the enlarged nozzle-receiving portion of the opening but terminates above the conduit when the latter is disposed in the narrow depending portion of the opening, whereby said cap will largely close said opening and will lock the nozzle-equipped conduit in its storage position.

3. In a portable hand-operated liquid container and sprayer, an elongated normally vertically disposed tubular outer casing that is closed at its bottom and is adapted to store liquid to a predetermined maximum level spaced below the top thereof, a piston pump in the bottom portion of the tubular outer casing below the normal maximum fluid level therein, said pump comprising a pressure cylinder carried by and extending upwardly from the closed bottom of the tubular outer casing, a reciprocating piston mounted in said pressure cylinder, a piston rod extending from the pressure piston and working through one end of the pressure cylinder and the corresponding end of the outer casing, a spring yieldably urging the pressure piston and plunger in the direction of piston rod extension, the pressure cylinder being provided with check valve equipped inlet and outlet passages located adjacent the bottom interior portion of the outer casing, the said check valve equipped inlet passage being in liquid receiving communication with the liquid containing lower portion of the tubular outer casing, a flexible delivery conduit extending from the check valve equipped outlet passage of the pressure pump through the outer casing and being provided at its free outer end with a diametrically enlarged spray nozzle, an aperture in a side wall portion of the outer casing adjacent to but spared from the upper end thereof, said opening comprising a relatively large diameter upper portion sized to receive the said spray nozzle, and a depending relatively narrow portion of a width less than the diameter of the spray nozzle but greater than that of the delivery conduit, said spray nozzle being of greater diameter than that of the delivery conduit, whereby to receive and store and anchor the nozzle within the upper portion of the casing, and an upwardly displaceable cap closing the upper end portion of the casing, said cap being in telescopic engagement with the casing and having a depending portion which covers and closes the enlarged nozzle-receiving portion of the opening but terminates above the conduit when the latter is disposed in the narrow depending portion of the opening, whereby said cap will largely close said opening and will lock the nozzle-equipped conduit in its storage position.

4. In a portable hand-operated liquid container and sprayer, an elongated normally vertically disposed tubular outer casing that is closed at its bottom and is adapted to store liquid to a predetermined maximum level spaced below the top thereof, a piston pump in the bottom portion of the tubular outer casing below the normal maximum fluid level therein, said pump comprising a pressure cylinder carried by and extending upwardly from the closed bottom of the tubular outer casing, a reciprocating piston mounted in said pressure cylinder, a ground-engaging piston rod extending from the pressure piston and working through the lower end of the pressure cylinder and the closed bottom end of the outer casing, a spring yieldably urging the pressure piston and plunger in a downward direction, the pressure cylinder being provided with check valve equipped inlet and outlet passages located adjacent the bottom interior portion of the outer casing, the said check valve equipped inlet passage being in liquid receiving communication with the liquid containing lower portion of the tubular outer casing, a flexible delivery conduit extending from the check valve equipped outlet passage of the pressure pump through the outer casing and being provided at its free outer end with a diametrically enlarged spray nozzle, an aperture in a side wall portion of the outer casing adjacent to but spaced from the upper end thereof, said opening comprising a relatively large diameter upper portion sized to receive the said spray nozzle, and a depending relatively narrow portion of a width less than the diameter of the spray nozzle but greater than that of the delivery conduit, said spray nozzle being of greater diameter than that of the delivery conduit, whereby to receive and store and anchor the nozzle within the upper portion of the casing, and an upwardly displaceable cap closing the upper end portion of the casing, said cap being in telescopic engagement with the casing and having a depending portion which covers and closes the enlarged nozzle-receiving portion of the opening but terminates above the conduit when the latter is disposed in the narrow depending portion of the opening, whereby said cap will largely close said opening and will lock the nozzle-equipped conduit in its storage position.

References Cited in the file of this patent

UNITED STATES PATENTS

| | | |
|---|---|---|
| 662,980 | Shepard | Dec. 4, 1900 |
| 1,868,235 | Jaden | July 19, 1932 |
| 2,508,104 | Dickensheets | May 16, 1950 |
| 2,689,068 | Lunn et al. | Sept. 14, 1954 |

FOREIGN PATENTS

| | | |
|---|---|---|
| 26,004 | Austria | Oct. 10, 1906 |